April 17, 1951     B. J. CHAPMAN     2,548,944
BUMPER JACK ATTACHMENT UNIT
Filed Aug. 13, 1949     2 Sheets-Sheet 1
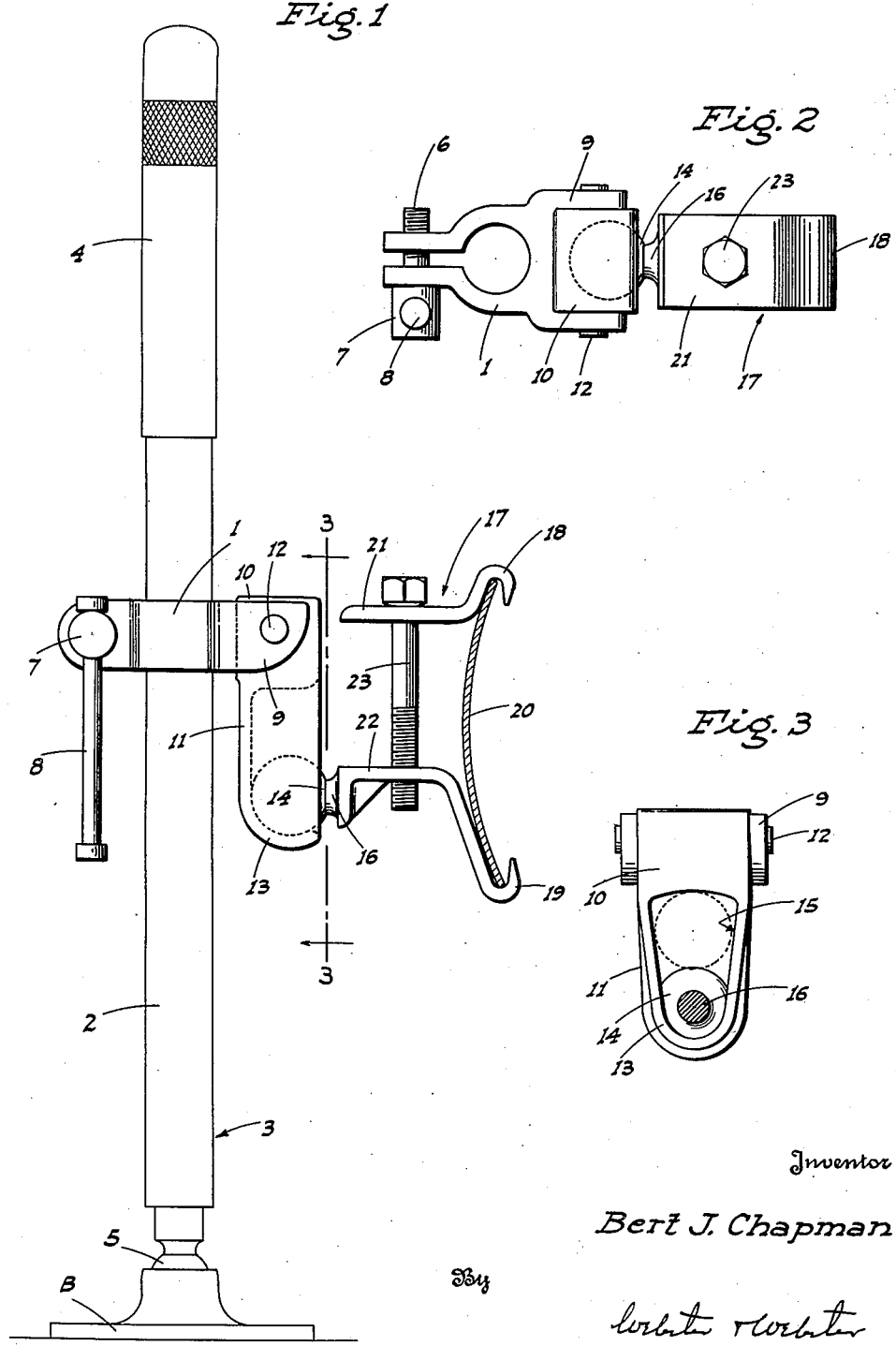
Inventor
Bert J. Chapman April 17, 1951 B. J. CHAPMAN 2,548,944
BUMPER JACK ATTACHMENT UNIT
Filed Aug. 13, 1949 2 Sheets-Sheet 2

Inventor
Bert J. Chapman

By

ATTORNEYS

Patented Apr. 17, 1951

2,548,944

UNITED STATES PATENT OFFICE 2,548,944

BUMPER JACK ATTACHMENT UNIT

Bert J. Chapman, Marysville, Calif.

Application August 13, 1949, Serial No. 110,194

10 Claims. (Cl. 254—133)

This invention is directed to, and it is an object to provide, a novel attachment unit for securing a jack to an automobile bumper in a safe and effective manner.

Another object of the invention is to provide a bumper jack attachment unit which is constructed to compensate for any out-of-level of the automobile relative to the jack, or lateral tilt of the bumper due to lifting of the same on one side. In other words, the arrangement is such that the jack remains substantially perpendicular at all times when in use, avoiding the possibility of its falling over due to tilt of the automobile, or slight motion thereof.

A further object of the invention is to provide a novel bumper clamp assembly which, when secured to the bumper, is prevented from accidental escape.

An additional object of the invention is to provide a bumper jack attachment unit which is easy and convenient to secure to or remove from an automobile bumper.

It is also an object of the invention to provide a bumper jack attachment unit which is designed for ease and economy of manufacture.

A further object of the invention is to provide a practical and reliable bumper jack attachment unit, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the attachment unit as mounted on a jack and secured to an automobile bumper.

Fig. 2 is a top plan view of said attachment unit detached from the jack.

Fig. 3 is a section on line 3—3 of Fig. 1.

Figure 4:
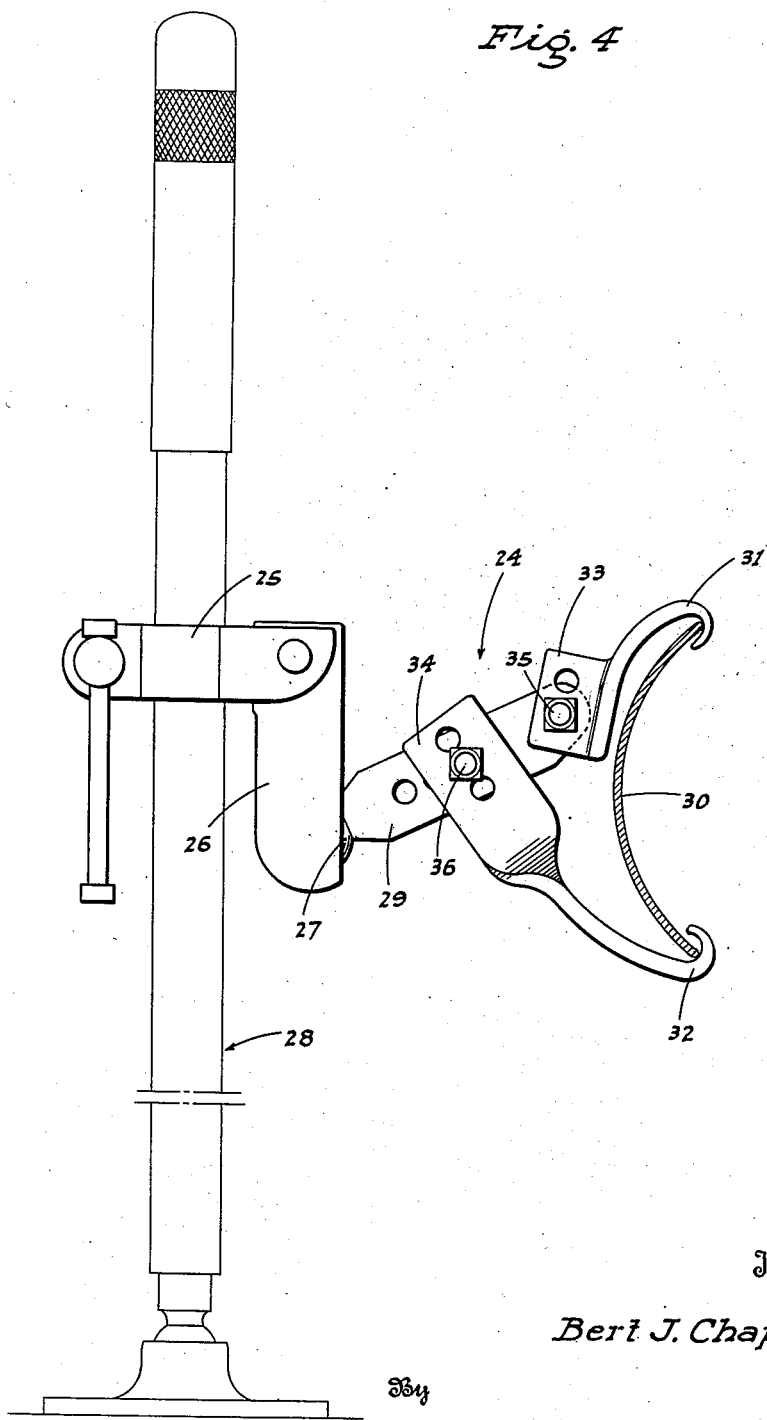
Fig. 4 is a side elevation of a modification of the attachment unit as mounted on a jack and secured to an automobile bumper.

Referring now more particularly to the characters of reference on the drawings, the novel bumper jack attachment unit comprises a clamping collar 1 of split type adapted to be clamped about the vertically adjustable post 2 of a jack, indicated at 3. The jack 3 may be of any suitable type, being here shown as a hydraulic type which includes a reciprocating actuating handle 4 at its upper end. At its lower end the jack 3 is secured to a base 4 by a vertical axis, ball and socket unit 5.

The clamping collar 1 is vertically adjustably secured on the post 2 by a clamping screw 6 having a head 7 on one end thereof; there being a cross handle 8 slidably extending through said head for the purpose of actuating said screw 6.

Adjustment of the clamping collar 1 up or down the post 2 is for the purpose of accommodating the following described attachment unit to an automobile bumper.

On the side opposite the screw 6 the clamping collar 1 is formed with a laterally projecting, outwardly opening yoke 9 in which the upper block-like end 10 of a suspension link 11 is pivoted by means of a transverse pivot pin 12. As so mounted the suspension link 11 is swingable in a vertical plane lengthwise of the automobile when the jack is in use.

Below the yoke 9 the suspension link 11 is formed with a vertically elongated, outwardly opening socket 13 adapted to receive a ball 14 therein whereby to form a ball and socket unit.

The mouth 15 of the socket 13 tapers downwardly, as clearly shown in Fig. 3, whereby when the ball 14 is engaged in the lower end of the socket 13 it cannot escape the latter. However, when the ball is in the upper end of the socket 13, as in dotted lines in Fig. 3, it can be placed in or removed from said socket.

The ball 14 includes an outwardly projecting neck 16 connected to a bumper clamp assembly, indicated generally at 17, and which assembly is constructed as follows:

The bumper clamp assembly 17 comprises an upper hook 18 and a lower hook 19 adapted to engage in straddling relation over the upper and lower edges, respectively, of an automobile bumper 20.

The hooks 18 and 19 include outwardly projecting flanges 21 and 22 connected together by a bolt 23. After engagement of the hooks 18 and 19 with the bumper 20, tightening of the bolt 23 effectively secures the assembly to the automobile bumper and holds it thereon against accidental escape while the jack is in use. The neck 16 of the ball 14 is secured in rigid relation to the flange 22.

When the jack is in use the described bumper clamp assembly is secured to the bumper 20, and then the jack 3 is placed on the ground in an upstanding position adjacent the ball 14. Thereafter, the clamping collar 1 is slid on the post 2 to permit the ball 14 to be engaged in the upper portion of the socket 13 and then seated in the lower portion of the latter. With the ball 14 thus seated in the lower portion of the socket 13, the clamping collar 1 is tightened by the handle 8 and screw 6. With the parts thus arranged the jack 3 is actuated by the handle 4 to cause the post 2 to forcefully rise. When this occurs the suspension link 11 likewise rises, lifting the ball 14, bumper clamp assembly 17, and bumper 20 to which the latter is secured.

In this manner the adjacent portion of the automobile is effectively lifted, for the purpose of tire changing or the like.

By reason of the universal connection provided by the ball 14 and socket 13, together with the pivotally mounted suspension link 11, the described attachment unit automatically compensates for tilt of the bumper 20, and any slight motion of the car, during the raising operation, either forwardly or laterally.

Thus, the jack 3 is always maintained, when in use, in a substantially perpendicular position, minimizing the risk of upsetting and affording greater safety.

With the described attachment unit a jack may be secured to an automobile bumper, manually, in a ready and convenient manner.

In Fig. 4 there is illustrated a modification of the bumper clamp assembly, which assembly is indicated generally in said figure at 24. In this embodiment the clamping collar, suspension link, and ball and socket unit remain the same as before, being indicated at 25, 26, and 27, respectively; the clamping collar 25 being affixed to the jack 28 in the same manner.

Here, however, the bumper clamp assembly comprises an outwardly projecting lever arm 29 rigidly fixed to the ball of the ball and socket unit 27 and projecting outwardly therefrom at a normally upward incline.

The bumper 30 is engaged, at its upper and lower edges, by hooks 31 and 32, respectively, formed—at their inner ends—with attachment pads 33 and 34, both adjustably secured to the lever arm 29 by bolts 35 and 36, respectively. The attachment pad 33 of the upper hook 31 is adjustably secured to the outer end portion of the lever arm 29, while the attachment pad 34 of the lower hook 32 is adjustably secured to said lever arm intermediate its ends; the adjustment in both instances being accomplished through the medium of multiple adjustment holes in the parts, as shown.

When the attachment unit as in Fig. 4 is in use, with the hooks 31 and 32 engaged over the upper and lower edges of the bumper 30, respectively, upward motion of the suspension link 26 and ball and socket unit 27 caused by the jack working against the weight of the automobile, imparts a lift to the lever arm 29 and produces an opposed leverage which pulls down on the hook 31 and pulls up on the hook 32 whereby said hooks are effectively maintained in clamped relation on the bumper, and against accidental slippage or escape.

This embodiment also has the advantage of automatic compensation for tilt of the bumper when the jack is in use; such compensation resulting from the ball and socket unit 27 and the pivotally mounted suspension link 26.

The attachment unit in either embodiment provides a very practical and reliable structure for securing a jack to an automobile bumper in a positive and safe manner.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An attachment unit for securing the vertically adjustable post of a jack to an automobile bumper, comprising a member on the post, a suspension link transversely pivoted on and depending from said member, a clamp assembly adapted to engage the bumper, and a ball and socket connection between the suspension link and said clamp assembly.

2. An attachment unit for securing the vertically adjustable post of a jack to an automobile bumper, comprising a member on the post, a suspension link transversely pivoted on and depending from said member, a clamp assembly adapted to engage the bumper, and a ball and socket connection between the suspension link and said clamp assembly; said clamp assembly including hooks for engagement over the upper and lower edges of the bumper, spaced flanges on the hooks, and an adjustable tie bolt between said flanges, the ball and socket connection being fixed to one of said flanges.

3. An attachment unit for securing the vertically adjustable post of a jack to an automobile bumper, comprising a member on the post, a suspension link transversely pivoted on and depending from said member, a clamp assembly adapted to engage the bumper, and a ball and socket connection between the suspension link and said clamp assembly; said connection including a ball fixed to the clamp assembly, the link being provided with a vertically disposed elongated socket, and a mouth opening into the socket along its length, the upper end of the mouth being of a width to admit the ball into the socket, and the lower end of the mouth being of a width to retain the ball in the socket.

4. An attachment unit, as in claim 3, in which the mouth of the vertically elongated socket tapers downwardly from the top portion.

5. An attachment unit for securing the vertically adjustable post of a jack to an automobile bumper, comprising a vertically adjustable collar on the post, a suspension link transversely pivoted to the collar and depending alongside the post, a clamp assembly adapted to engage the bumper, and a ball and socket connection between the clamp assembly and the suspension link.

6. An attachment unit for securing the vertically adjustable post of a jack to an automobile bumper, comprising a vertically adjustable collar on the post, a suspension link transversely pivoted to the collar and depending alongside the post, a clamp assembly adapted to engage the bumper, and a ball and socket connection between the clamp assembly and the suspension link; the ball being on the clamp assembly and projecting horizontally therefrom, and the socket being in the link and cradling the ball therein when the jack is in use.

7. An attachment unit for securing the vertically adjustable post of a jack to an automobile bumper, comprising a vertically adjustable collar on the post, a suspension link transversely pivoted to the collar and depending alongside the post, a clamp assembly adapted to engage the bumper, and a ball and socket connection between the clamp assembly and the suspension link; the ball being on the clamp assembly and projecting horizontally therefrom, and the socket being in the link and cradling the ball therein when the jack is in use, said socket being vertically elongated, the link being provided with a mouth opening into the socket along the length thereof, the upper end of the mouth being of a width to admit the ball into the socket, and the lower end of the mouth being of a width to retain the ball in the socket.

8. An attachment unit for securing the vertically adjustable post of a jack to an automobile bumper, comprising means for vertically moving the post, a member on the post and movable vertically therewith, hooks adapted to engage over the upper and lower edges of the bumper, and a lever system connected between said hooks and member operative to urge said hooks toward each other upon raising of said member by the post; said lever system including a vertically swingable lever arm, and means pivoting said hooks to the lever arm at spaced points therealong.

9. An attachment unit for securing the vertically adjustable post of a jack to an automobile bumper, comprising means for vertically moving the post, a member on the post and movable vertically therewith, hooks adapted to engage over the upper and lower edges of the bumper, and a lever system connected between said hooks and member operative to urge said hooks toward each other upon raising of said member by the post; said lever system including a vertically swingable lever arm, and means pivoting said hooks to the lever arm at spaced points therealong, the upper hook being pivoted to the lever arm at the outer end, and the lower hook being pivoted to the lever arm intermediate its ends.

10. An attachment unit for securing the vertically adjustable post of a jack to an automobile bumper, comprising a member on the post, a suspension link transversely pivoted to and depending from the member, a lever arm projecting outward from adjacent the suspension link, a ball and socket unit connection between the link and inner end of the lever, upper and lower hooks adapted to engage the bumper from above and below respectively, means transversely pivoting the upper hook to the outer end of the lever arm, and means transversely pivoting the lower hook to the lever arm intermediate its ends.

BERT J. CHAPMAN.

REFERENCES CITED

The following references are of record in the file of this patent:

UNITED STATES PATENTS

| Number | Name | Date |
|---|---|---|
| 2,456,375 | Cedarholm | Dec. 14, 1948 |